United States Patent
Nishiwaki (10) Patent No.: US 9,069,167 B2
(45) Date of Patent: Jun. 30, 2015

(54) ILLUMINATION APPARATUS FOR MICROSCOPE AND MICROSCOPE USING THE SAME

(71) Applicant: OLYMPUS CORPORATION, Shibuya-ku, Tokyo (JP)

(72) Inventor: Daisuke Nishiwaki, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/056,765

(22) Filed: Oct. 17, 2013

(65) Prior Publication Data

US 2014/0126048 A1    May 8, 2014

(30) Foreign Application Priority Data

Nov. 2, 2012   (JP) .................................. 2012-243176

(51) Int. Cl.
G02B 21/06    (2006.01)
G02B 26/08    (2006.01)

(52) U.S. Cl.
CPC ............ G02B 21/06 (2013.01); *G02B 26/0833* (2013.01)

(58) Field of Classification Search
CPC .... G02B 5/0236; G02B 27/28; G02B 27/281; G02B 27/286; G02B 27/4261; G02B 21/24; G02B 21/22; G02B 21/14; G02B 21/06; G02B 21/00
USPC ............... 359/386, 362, 367, 492.01, 493.01, 359/370, 371
See application file for complete search history.

(56) References Cited

U.S. PATENT DOCUMENTS

| | | | |
|---|---|---|---|
| 7,605,976 B1 * | 10/2009 | Wolleschensky et al. ..... | 359/386 |
| 7,884,337 B2 | 2/2011 | Hasegawa et al. | |
| 7,894,136 B2 * | 2/2011 | Betzig ........................... | 359/577 |
| 2005/0024720 A1 * | 2/2005 | Cartlidge et al. ............. | 359/368 |
| 2010/0059696 A1 * | 3/2010 | Heintzmann et al. ......... | 250/550 |
| 2011/0102888 A1 | 5/2011 | Honda et al. | |
| 2012/0228475 A1 * | 9/2012 | Pang et al. ................. | 250/208.1 |

FOREIGN PATENT DOCUMENTS

| | | |
|---|---|---|
| JP | 4425098 B2 | 3/2010 |
| JP | 2011-118371 A | 6/2011 |

* cited by examiner

*Primary Examiner* — Scott J Sugarman
*Assistant Examiner* — William R Alexander
(74) *Attorney, Agent, or Firm* — Holtz, Holtz, Goodman & Chick PC (57) ABSTRACT

A illumination apparatus for microscope comprises a light source, a spatial modulation section, a first illumination optical system, a second illumination optical system, and the spatial modulation section includes a spatial modulation element which is of reflecting type, and a polarizing element, and the first illumination optical system is disposed in an optical path from the light source up to the spatial modulation element, and the second illumination optical system is disposed in an optical path from the spatial modulation element up to a specimen position, and a position of the spatial modulation element is conjugate with the specimen position. Moreover, a microscope comprises a illumination apparatus, a main-body section, an observation unit, and a control unit, and the illumination apparatus for microscope is to be used as the illumination apparatus.

8 Claims, 5 Drawing Sheets

ILLUMINATION APPARATUS FOR MICROSCOPE AND MICROSCOPE USING THE SAME

CROSS-REFERENCE TO RELATED APPLICATION

The present application is based upon and claims the benefit of priority from the prior Japanese Patent Application No. 2012-243176 filed on Nov. 2, 2012; the entire contents of which are incorporated herein by reference.

BACKGROUND OF THE INVENTION

1. Field of the Invention

The present invention relates to an illumination apparatus for microscope, and a microscope using the same.

2. Description of the Related Art

In recent years, a field called optogenetics has been showing a widespread expansion. Moreover, in an observation of a biological specimen, a fluorescence recovery after photobleaching (FRAP) has been used widely as a conventional observation method. In an observation in optogenetics, and an observation by the fluorescence recovery after photobleaching, sometimes light is irradiated only to a part of the specimen, such as a cell. In the cell to which the light has been irradiated, there occurs a change due to the light irradiated becoming a stimulus. Moreover, in a case in which, there is a cell around the cell to which the light has been irradiated, sometimes there occurs a change also in the cell which is around the cell to which the light has been irradiated. Therefore, at the time of observation, one entire cell, or a plurality of cells is illuminated. In such manner, in the observation by the fluorescence recovery after photobleaching, and in the observation by the optogenetics, an illumination area for imparting stimulus and an illumination area for making observation, differ.

Moreover, in a case in which, there is a plurality of objects to be stimulated, it is necessary to illuminate a plurality of locations which are separated spatially, and it is necessary to control an illumination time individually for each location, according to the number of objects and a position.

As an illumination apparatus in which, it is possible to set the illumination area, the illumination position, and the illumination time, an illumination apparatus disclosed in Japanese Patent Application Laid-open Publication No. 2011-118371 and an illumination apparatus disclosed in Japanese Patent No. 4425098 are available.

In the illumination apparatus described in Japanese Patent Application Laid-open Publication No. 2011-118371, light from a light source is irradiated to a specimen via a digital micro mirror device (hereinafter, referred to as 'DMD'). The DMD is a device having a plurality of micro mirrors, and the micro mirrors are disposed two-dimensionally. The illumination area, the illumination position, or the illumination time is changed by changing a direction of each micro mirror.

In the illumination apparatus described in Japanese Patent No. 4425098, light from a light source is irradiated to a specimen via a spatial light modulation element. Moreover, a device having a liquid crystal, or the DMD, has been used as the spatial light modulation element. This device having the liquid crystal has a plurality of micro areas having the liquid crystal, and these micro areas are disposed two-dimensionally.

Moreover, in the illumination apparatus described in Japanese Patent No. 4425098, a surface of the spatial light modulation element is disposed to be inclined with respect to a specimen surface. Here, if the spatial light modulation element is let to be conjugate with the specimen plane, a projection plane of the spatial light modulation element intersects with the specimen plane. In this case, a portion other than an intersecting portion is not subjected to a focused illumination. Therefore, in the illumination apparatus described in Japanese Patent No. 4425098, the spatial light modulation element is considered to be an element which is disposed at a pupil position of an optical system.

Figure 5A:
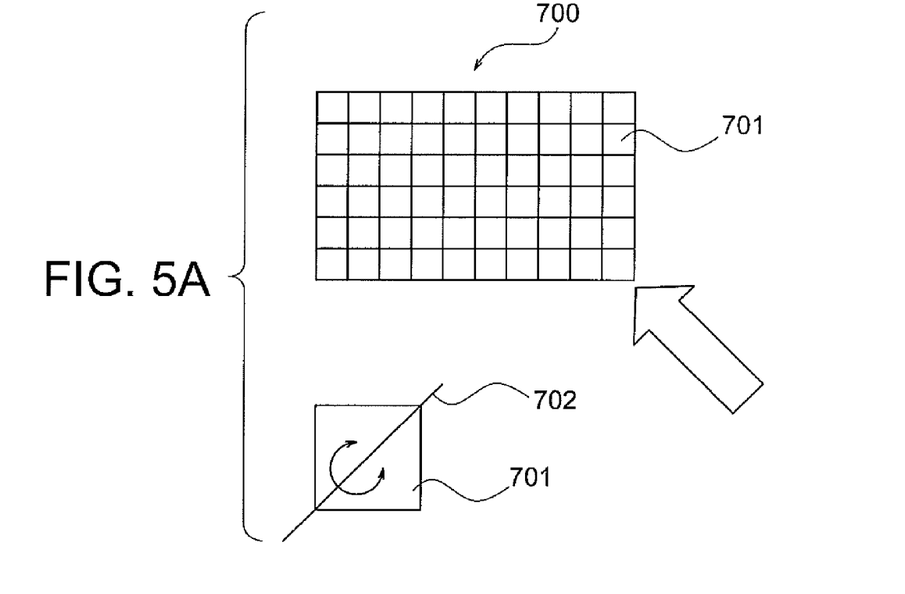
FIG. 5A is a diagram showing a structure of the DMD.
Figure 5B:
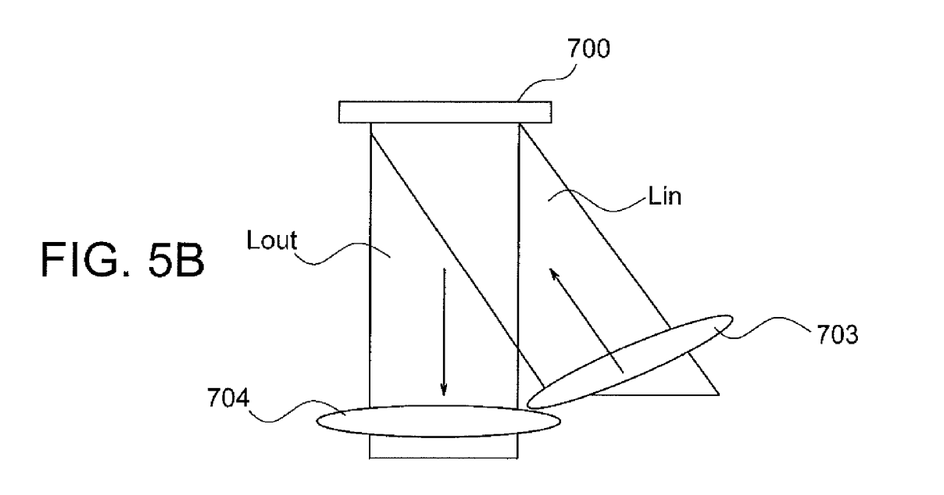

FIG. 5A and FIG. 5B are diagrams showing an arrangement of the DMD and the optical system. FIG. 5A is a diagram showing a structure of the DMD. As shown in FIG. 5A, a DMD 700 has a plurality of micro mirrors 701. Moreover, the micro mirrors 701 are disposed two-dimensionally. Here, the micro mirror 701 oscillates through a predetermined angle around an axis, with a diagonal 702 as an axis. By the oscillation of the micro mirror 701, the micro mirror 701 changes a direction of a mirror surface.

Generally, light is irradiated to the DMD 700 via the optical system. A direction of incidence of light is a direction orthogonal to the diagonal 702 as shown by an arrow mark in FIG. 5A. In this case, the optical system is positioned obliquely downward or obliquely upward with respect to the DMD 700. Therefore, it is not possible to dispose the DMD 700 and the optical system in the same plane.

FIG. 5B is a diagram showing an arrangement of the DMD and the optical system. Illumination light $L_{in}$ is incident on the DMD 700 via an optical system 703. The illumination light $L_{in}$ is reflected at the micro mirrors 701 of the DMD 700, and is emerged from the DMD 700 as illumination light $L_{out}$. The illumination light $L_{out}$ emerged from the DMD 700 reaches a specimen via an optical system 704.

In FIG. 5B, a traveling direction of the illumination light emerged from the DMD 700 is a normal direction of a surface of the DMD 700. For making such an arrangement, it is indispensable to make an angle of incidence of the illumination light $L_{in}$ on the DMD 700 small. It is necessary to dispose the optical system 703 in a direction inclined with respect to the DMD 700. An angle of the optical system 703 with respect to the DMD 700 corresponds to an angle through which the micro mirror 701 oscillates. Here, when a position of the optical system 703 is near the DMD 700, the illumination light $L_{out}$ is incident on the optical system 703, and the optical system 703 and the optical system 704 make a contact. To avoid this, it is preferable to keep the optical system 703 and the optical system 704 at a distance from the DMD 700. However, when the optical system 703 and the optical system 704 are kept at a distance from the DMD 700, a size of the illumination apparatus becomes large.

Moreover, as it has been mentioned above, the optical system 703 is positioned at an obliquely upward position, or at an obliquely downward position. Therefore, a position adjustment of the DMD 700 and the optical system 703 becomes complicated. Moreover, an efficiency of light in the DMD 700 is low.

SUMMARY OF THE INVENTION

A illumination apparatus for microscope according to the present invention comprises a light source, a spatial modulation section, a first illumination optical system, and a second illumination optical system, and the spatial modulation section includes a spatial modulation element which is of reflecting type, and a polarizing element, and the first illumination optical system is disposed in an optical path from the light source up to the spatial modulation element, and the second illumination optical system is disposed in an optical path from the spatial modulation element up to a specimen position, and a position of the spatial modulation element is conjugate with the specimen position.

Moreover, a microscope according to the present invention comprises a illumination apparatus, a main-body section, an observation unit, and a control unit, and the illumination apparatus for microscope is to be used as the illumination apparatus.

BRIEF DESCRIPTION OF THE DRAWINGS

FIG. 5A and FIG. 5B are diagrams showing an arrangement of a DMD and an optical system, where, FIG. 5B is a diagram showing an arrangement of the DMD and optical systems.

DETAILED DESCRIPTION OF THE INVENTION

A illumination apparatus for microscope according to the present embodiment includes a light source, a spatial modulation section, a first illumination optical system, and a second illumination optical system, and the spatial modulation section includes a spatial modulation element which is of reflecting type, and a polarizing element, and the first illumination optical system is disposed in an optical path from the light source up to the spatial modulation element, and the second illumination optical system is disposed in an optical path from the spatial modulation element up to a specimen position, and a position of the spatial modulation element is conjugate with the specimen position.

Figure 1A:
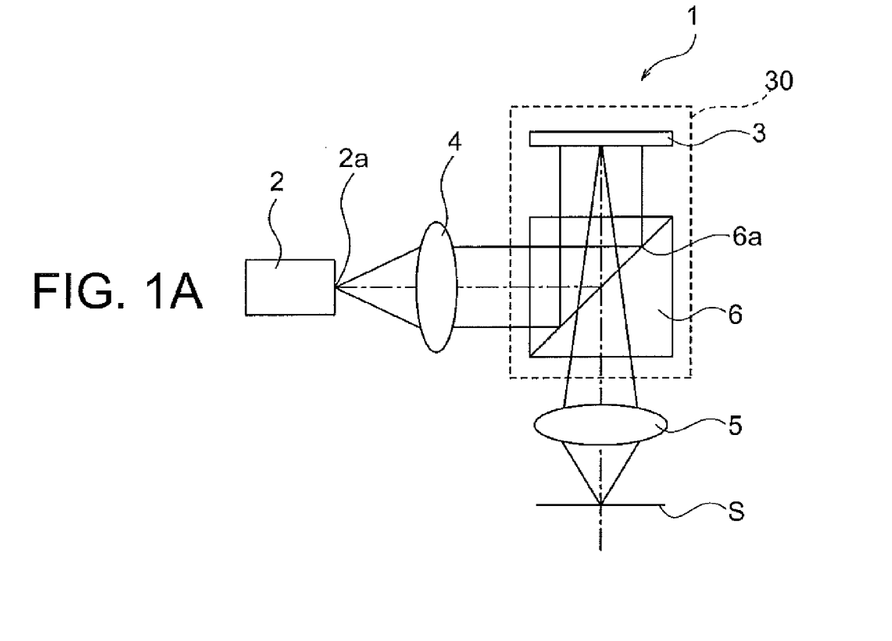
FIG. 1A is a schematic diagram showing an arrangement of a illumination apparatus for microscope according to an embodiment of the present invention.

An arrangement of the illumination apparatus for microscope according to the present embodiment will be described below. FIG. 1A is a schematic diagram showing an arrangement of the illumination apparatus for microscope according to the present embodiment. As shown in FIG. 1A, a illumination apparatus for microscope 1 includes a light source 2, a spatial modulation section 30, a first illumination optical system 4, and a second illumination optical system 5.

Illumination light for illuminating a specimen is emerged from the light source 2. A halogen lamp, a xenon lamp, a mercury lamp, a laser, and an LED (light emitting diode) are available as the light source 2.

The spatial modulation section 30 includes a spatial modulation element 3 of reflecting type and a polarizing beam splitter 6 (hereinafter, referred to as 'PBS 6'). Here, the PBS 6 is a polarizing element and is also a beam splitter. The spatial modulation element 3 includes a liquid crystal, and by changing a state of the liquid crystal, it is possible to modulate an intensity of light irradiated to a specimen. Concretely, the spatial modulation element 3 includes a plurality of micro areas (pixels). Moreover, the plurality of micro areas is arranged two-dimensionally. Each of the micro area includes a reflecting surface and a liquid crystal. A direction of polarization of light is changed by changing the state of the liquid crystal. By combining with the polarizing element, the intensity of light is controlled by an angle through which, the direction of polarization is rotated. Accordingly, it is possible to change the intensity of light emerged from the micro areas, for each micro area. A LCOS (liquid crystal on silicon) is available as the spatial modulation element 3.

The first illumination optical system 4 is disposed in an optical path from the light source 2 up to the spatial modulation element 3. Moreover, the second illumination optical system 5 is disposed in an optical path from the spatial modulation element 3 up to a specimen position S. In the illumination apparatus for microscope 1 according to the present embodiment, due to the second illumination optical system 5, a position of the spatial modulation element 3 and the specimen position S are conjugate. In a case of epi-illumination, due to the second illumination optical system 5 and a microscope objective lens, the position of the spatial modulation element 3 and the specimen position S are conjugate.

According to the illumination apparatus for microscope of the present embodiment, the spatial modulation element 3 being of reflecting type, it is possible to realize an illumination apparatus with a high efficiency of light. Moreover, the efficiency of light being high, it is possible to illuminate the specimen even more brightly. Accordingly, since an image of the specimen also becomes bright, it is possible to improve a contrast of an observation image.

Moreover, in the illumination apparatus for microscope of the present embodiment, it is preferable that the first illumination optical system and the second illumination optical system are disposed such that, an optical path of the first illumination optical system and an optical path of the second illumination optical system intersect, and the beams splitter is disposed at a position where the optical paths intersect, and the spatial modulation element is disposed in a direction in which, the light from the first illumination optical system is reflected by the beam splitter, and the second illumination optical system is disposed at a position facing the spatial modulation element, sandwiching the beam splitter.

As shown in FIG. 1A, the first illumination optical system 4 and the second illumination optical system 5 are disposed such that an optical path (optical axis) of the first illumination optical system 4 and an optical path of the second illumination optical system 5 intersect. Moreover, the PBS 6 is disposed as a beam splitter at a position where the optical paths intersect. As it has been mentioned above, the PBS 6 serves functions of both the beam splitter and the polarizing element. In an illumination apparatus for microscope according to a modified embodiment (to be described later), a half mirror prism 6' as a beam splitter is disposed at a position at which, the optical paths intersect. In such manner, the optical path of the first illumination optical system 4 and the optical path of the second illumination optical system 5 are partially common. Moreover, an optical axis of the first illumination optical system 4 and an optical axis of the second illumination optical system 5 are positioned in the same plane. In other words, the first illumination optical system and the second illumination optical system are positioned in the same plane. Therefore, it is possible to make the illumination apparatus small, and to realize a illumination apparatus in which, an adjustment of the optical system is easy.

The light source 2 includes a light emitting portion 2a. In a case in which, the light source 2 is a mercury lamp for example; an electric discharge portion between two electrodes corresponds to the light emitting portion 2a. Moreover, in a case of light emerged from the light source 2 by an optical fiber, a light-emerging end surface of the optical fiber corresponds to the light emitting portion 2a. Moreover, in a case in which, the light source 2 is a laser, a portion from where, laser light emerges (outlet for laser beam) corresponds to the light emitting portion 2a.

In a case of using a laser that emits parallel light, as the light source 2, for the laser light emitted from the light emitting portion 2a to become a parallel light beam, it is desirable that the first illumination optical system 4 is an afocal zoom optical system in which, laser light is irradiated to the entire surface of the spatial modulation element 3. In FIG. 1A, since an optical fiber for example, is adopted as the light source 2 that radiates divergent light, and the divergent light is emitted from the light emitting portion 2a, the first illumination optical system 4 is a collimating optical system in which, the light is irradiated to the entire surface of the spatial modulation element 3.

In FIG. 1A, although the first illumination optical system 4 is let to be the collimating optical system, the first illumination optical system 4 may not be the collimating optical system necessarily, provided that, the light is irradiated to the entire surface of the spatial modulation element 3. Moreover, in a case in which, the light-emerging end surface of the optical fiber has an area to some extent as in a liquid light guide, and has an even light emitting surface, it is possible to adopt an optical system in which, the light emitting portion 2a and the spatial modulation element 3 are conjugate, with magnification that enables to irradiate light to the entire surface of the spatial modulation element 3.

The illumination light that has been emitted from the light emitting portion 2a passes through the first illumination optical system 4, and is incident on the PBS 6 of the spatial modulation element 30. Only an S-polarized component of the illumination light incident on the PBS 6 is reflected at a polarizing surface 6a of the PBS 6. The illumination light of the S-polarized component reflected at the polarizing surface 6a is incident on the spatial modulation element 3.

In the spatial modulation element 3, a direction of polarization of light is rotated at each micro area. Moreover, an angle of the direction of polarization is changed continuously. Therefore, for instance, in the spatial modulation element 3, it is possible to set freely a micro area for which, the maximum rotation occurs (micro area for which, the angle of rotation of the direction of polarization is 90 degrees), and a micro area for which, no rotation occurs (micro area for which, the angle of rotation of the direction of polarization is 0 degrees).

The S-polarized component of the illumination light that is incident on the polarizing surface 6a of the PBS 6 of the spatial modulation section 30 reaches the spatial modulation element 3, and is reflected at the spatial modulation element 3. An arrangement is made such that, the illumination light reflected has an effect of the rotation of the spatial modulation element 3 in the direction of polarization, and includes a P-polarized component for instance. Next, the illumination light reflected at the spatial modulation element 3 is incident once again on the PBS 6. The P-polarized component of the illumination light incident on the PBS 6 is transmitted through the polarizing surface 6a. Whereas, the S-polarized component of the illumination light is reflected at the polarizing surface 6a. The illumination light (P-polarized component) transmitted through the polarizing surface 6a is incident on the second illumination optical system 5. The illumination light incident on the second illumination optical system 5 passes through the second illumination optical system 5, and reaches the specimen position S.

Here, the specimen position S and the spatial modulation element 3 being conjugate, when viewed from a specimen side via the polarizing element (PBS 6), it looks similar as the spatial modulation element 3 emits light by reflecting the illumination light. Therefore, the micro areas of the spatial modulation section 30 will be called as a light emitting portion. By changing an area of the micro areas for which, the rotation in the direction of polarization occurs, and changing the angle of rotation in the direction of polarization for each micro area, it is possible to realize light emitting portions having various shapes and intensities, by the polarizing elements (PBS 6) in the spatial modulation section 30. For instance, by letting the micro area at which the reflection occurs to be circular, it is possible to make the light emitting portion circular. Or, by letting the micro area at which the reflection occurs to be annular, it is possible to make the light emitting portion annular.

As it has been mentioned above, the position of the spatial modulation element 3 and the specimen position S are conjugate. Therefore, the shape of the light emitting portion in the spatial modulation section 30 (shape of the micro area at which the reflection occurs) is projected on the specimen position (on the specimen). As a result, shape same as or similar to the shape of the light emitting portion in the spatial modulation section 30 is formed on the specimen position S (on the specimen). Therefore, by changing the shape of the light emitting portion in the spatial modulation element 3, an illumination area and a illumination position in the specimen can be changed. Moreover, by changing a time of maintaining a state of the liquid crystal, the illumination time can also be changed.

As the illumination apparatus for microscope 1 shown in FIG. 1A, by using the PBS (polarizing beam splitter) as a beam splitter, only linearly polarized light is made to be incident on the spatial modulation element. Since the spatial modulation element has polarization characteristics, in the micro area of the spatial modulation element, it is possible to make clear a different between a state in which, the reflection occurs, and a state in which, the reflection does not occur. Accordingly, since it is possible to make clear a boundary of the illumination area, it is possible to prevent a degradation of contrast of an observation image.

Moreover, since the spatial modulation element has the polarization characteristics, by using the PBS, it is possible to suppress loss of quantity of light when the light passes through the PBS. Accordingly, it is possible to realize an illumination apparatus having even higher efficiency of light. Moreover, since it is possible to have bright illumination, it is possible to improve the contrast of the observation image.

Figure 1B:
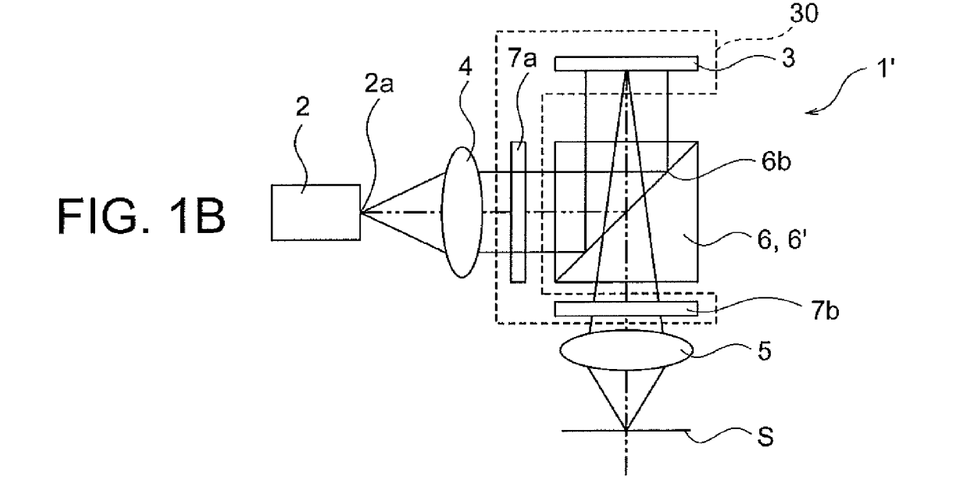
FIG. 1B is a diagram showing an arrangement of a illumination apparatus for microscope according to a modified embodiment of the embodiment of the present invention.

FIG. 1B is a schematic diagram showing an arrangement of the illumination apparatus for microscope according to a modified embodiment of the present embodiment. Points of difference from the illumination apparatus for microscope 1 are a point that, in the spatial modulation section 30, instead of the PBS 6, the half mirror prism 6' which is a beam splitter is disposed, a point that a polarizing plate 7a is disposed newly between the half mirror prism 6' and the first illumination optical system 4, and a point that a polarizing plate 7b is disposed newly between the spatial modulation element 3 and the second illumination optical system 5. In an illumination apparatus for microscope 1', the spatial modulation section 30 includes the polarizing plate 7a, the polarizing plate 7b, and the spatial modulation element 3. The polarizing plate 7a and the polarizing plate 7b become a polarizer and an analyzer respectively. The polarizing plate 7a and the polarizing plate 7b are arranged to have a mutually orthogonal directions of polarization such that the polarizing plate 7a for instance, allows transmitting a polarization component in a normal direction of a paper surface, and the polarizing plate 7b allows transmitting a polarization component in a direction parallel to the paper surface. There is no change in the rest of the arrangement.

Illumination light emitted from the light emitting section 2a passes through the first illumination optical system 4, and is incident on the polarizing plate 7a of the spatial modulation section 30. Only the polarization component in the normal direction of the paper surface of the illumination light incident on the polarizing plate 7a is transmitted through. Illumination light of the linearly polarized light in the normal direction of the paper surface that is transmitted through the polarizing plate 7a is reflected at a half mirror surface 6b of the half mirror prism 6', and is incident on the spatial modulation element 3.

The linearly polarized illumination light in the normal direction of the paper surface incident on the spatial modulation element 3 is reflected at the spatial modulation element 3. When reflected, the illumination light has an effect of the rotation in the direction of polarization at the spatial modulation element 3, and bears a polarization component parallel to the paper surface. The illumination light reflected at the spatial modulation element 3 is transmitted through the half mirror prism 6'. The illumination light transmitted is incident on the polarizing plate 7b. The polarization component parallel to the paper surface of the illumination light that is incident on the polarizing plate 7b is transmitted through the polarizing plate 7b. The illumination light transmitted through the polarizing plate 7b is incident on the second illumination optical system 5. The illumination light incident on the second illumination optical system 5 passes through the second illumination optical system 5, and reaches the specimen position S.

Since the polarizing plates are used in the illumination apparatus for microscope 1', it is possible to realize the spatial modulation section 30 having a high contrast compared to a case of using the PBS 6.

In the spatial modulation element in which, the liquid crystal is used, it is necessary to make the light incident upon letting a direction of vibration of the linearly polarized light coincide with a predetermined direction of the spatial modulation element. When light having a random state of polarization is made to be incident on the spatial modulation element, even when it is a micro area for which, no reflection is to be made to occur, the reflection occurs at that micro area. As the reflection occurs, irrespective of being an area which is not to be illuminated normally, the illumination light is irradiated to that area. As a result, light which becomes noise is generated, and accordingly the contrast of the observation image is degraded.

Therefore, by disposing a polarizing plate between the light source and the beam splitter, only the linearly polarized light is made to be incident on the spatial modulation element. Accordingly, in the micro areas of the spatial modulation element, it is possible to make clear the difference between the state in which, the reflection occurs, and the state in which, the reflection does not occur. As a result, since it is possible to make clear the boundary of the illumination area, it is possible to prevent the degradation of the contrast of the observation image.

Moreover, in the illumination apparatus for microscope according to the modified embodiment of the present embodiment, a polarizing plate which allows only linearly polarized light to be transmitted is disposed between the beam splitter and the second illumination optical system.

By making such arrangement, it is possible to shield light which becomes noise, by the polarizing plate. As a result, it is possible to improve the contrast of the observation image.

From a cost point of view, it is preferable to use the half mirror 6' as a beam splitter, as shown in FIG. 1B. However, in the arrangement in FIG. 1B, the PBS 6 may be used as a beam splitter. By using the PBS 6, it is possible to prevent the loss of quantity of light. Moreover, in a case of using the PBS 6, the spatial modulation section 30 may be let to have the polarizing plate 7b omitted.

FIG. 2A, FIG. 2C, FIG. 3A, and FIG. 3C are diagrams showing the shape of the light emitting portion in the spatial modulation section 30, and FIG. 2B, FIG. 2D, FIG. 3B, and FIG. 3D are diagrams showing a illumination area in an observation image. In FIG. 2A, FIG. 2B, FIG. 2C, and FIG. 2D and FIG. 3A, FIG. 3B, FIG. 3C, and FIG. 3D, for the ease of understanding, a position of the light emitting portion in the spatial modulation element 30 and a position of the illumination area of the observation image are made to coincide. For instance, in FIG. 2C and FIG. 2D, positions of both are lower-right. However, according to an arrangement of an optical system (frequency of image formation and frequency of reflection), the positions of both do not coincide necessarily.

Figure 2A:
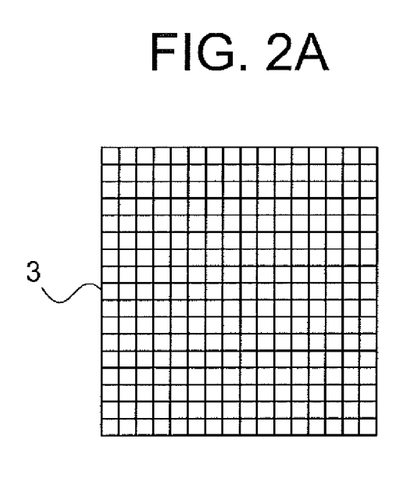
FIG. 2A and FIG. 2C are diagrams showing a shape of a micro area in which, reflection occurs.
Figure 2B:
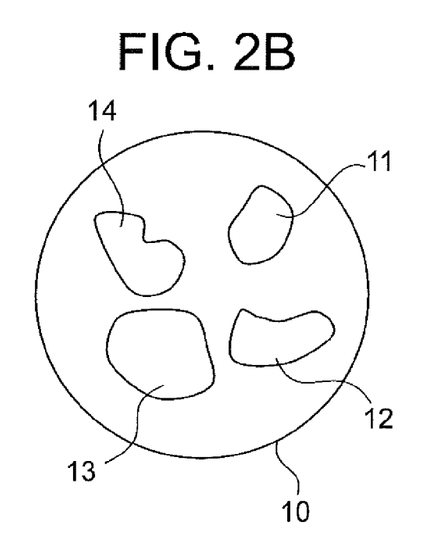
FIG. 2B and FIG. 2D are diagrams showing a illumination area in an observation image.

FIG. 2A, FIG. 2B, FIG. 2C, and FIG. 2D are examples in which, a width of the illumination area is changed. In FIG. 2A, reflection is made to occur at all the micro areas of the spatial modulation section 30. In this case, the illumination area in a specimen image is an entire area of an observation area 10 as shown in FIG. 2B. Therefore, illumination light is irradiated to all four specimens 11, 12, 13, and 14.

Figure 2C:
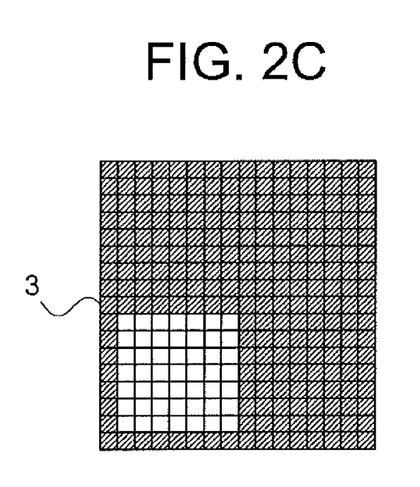
Figure 2D:
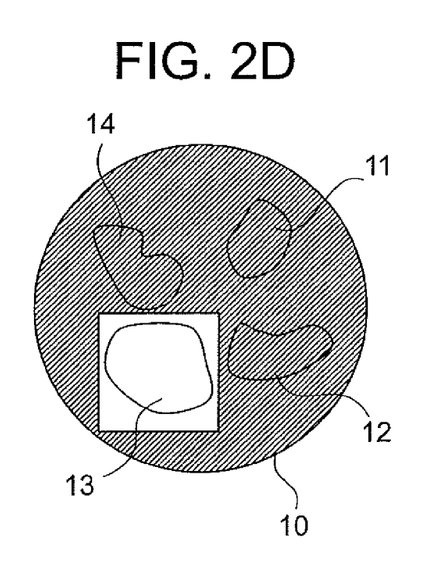

Next, in FIG. 2C, by changing the state of the liquid crystal in the micro areas of hatched portion out of all the micro areas of the spatial modulation element 3, an arrangement is made such that the reflection does not occur in the micro areas of the hatched portion. In this case, the illumination area in the specimen image is only the specimen 13 and a surrounding area thereof as shown in FIG. 2D. Consequently, the illumination light is irradiated to the specimen 13, but the illumination light is not irradiated to the specimens 11, 12, and 14.

Figure 3A:
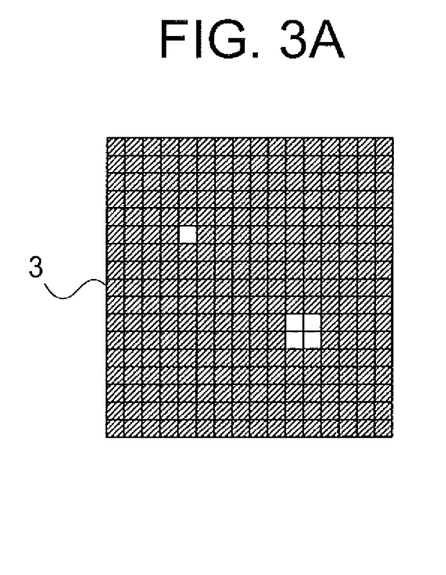
FIG. 3A and FIG. 3C are diagrams showing a shape of a micro area in which, reflection occurs.
Figure 3B:
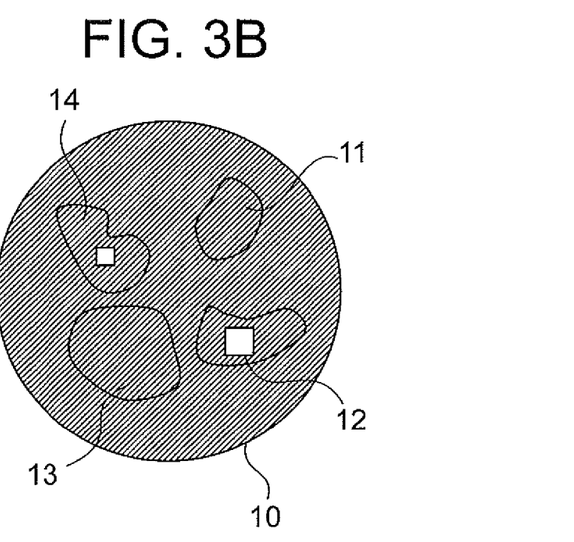
FIG. 3B and FIG. 3D are another diagrams showing a illumination area in an observation image.

FIG. 3A, FIG. 3B, FIG. 3C, and FIG. 3D are examples in which, an illumination area for imparting stimulus and an illumination area for observing are made to differ. In FIG. 3A, by changing the state of the liquid crystal in the micro areas of the hatched portion, and making an arrangement such that the reflection of the illumination light does not occur in the micro areas of the hatched portion, two locations which are spatially separated are illuminated. In this case, the illumination area of the specimen image is apart of the specimen 12 and a part of the specimen 14 as shown in FIG. 3B. Consequently, the illumination light is irradiated to the part of the specimen 12 and to the part of the specimen 14, and the illumination light is not irradiated to the remaining portion.

As shown in FIG. 3A, by irradiating the illumination light to the part of the specimen 12 and to the part of the specimen 14, stimulus is imparted to the specimen 12 and the specimen 14. A change in the stimulus occurs in the specimen 12 and the specimen 14, and by the change in the specimen 14, the specimen 11 also gets stimulated sometimes. Therefore, at the time of observation, an arrangement is made such that the illumination light is irradiated not only to the specimen 12 and the specimen 14, but also to the specimen 11.

Figure 3C:
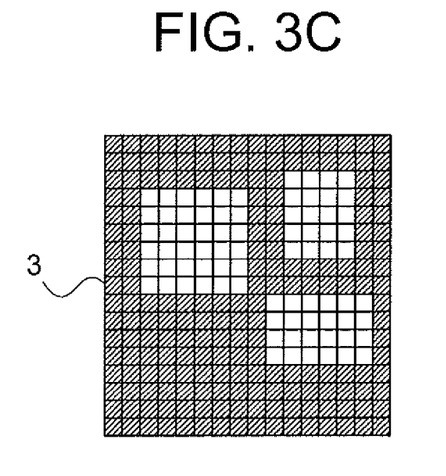
Figure 3D:
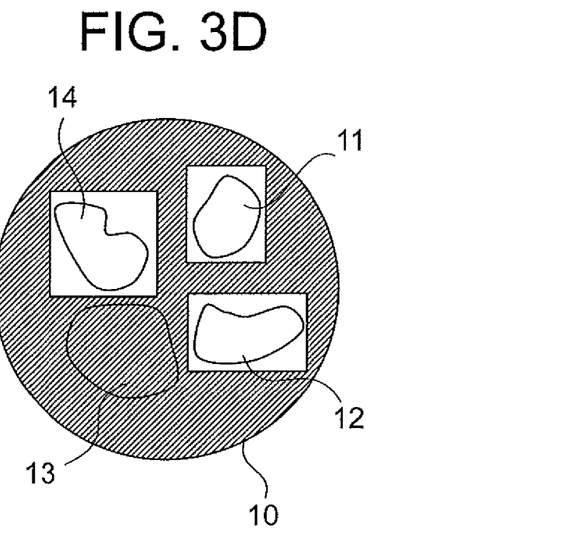

In FIG. 3C, by changing the state of the liquid crystal in the micro areas of the hatched portion, and making an arrangement such that the reflection of the illumination light does not occur at the micro areas of the hatched portion, three locations which are spatially separated are illuminated. In this case, the illumination area in the specimen image is such that the illumination light is irradiated to the specimens 11, 12, and 14, and the illumination light is not irradiated to the specimen 13 as shown in FIG. 3D.

In a projection of the light emitting portion 2a (light emitting area) on the spatial modulation element 3, it is preferable to make an arrangement such that the light emitting area of the light emitting portion 2a is projected on almost the entire surface of the spatial modulation element 3. However, an arrangement may be made such that the light emitting area of the light emitting portion 2a is projected on an area narrower than the entire surface of the spatial modulation element 3. Moreover, the first illumination optical system 4 may be made to be a zoom optical system. By making such arrangement, it is possible to change a size of the light emitting area (size of an image of the light emitting area of the light emitting portion 2a) on the spatial modulation element 3.

As it has been mentioned above, according to the illumination apparatus for microscope of the present embodiment, it is possible to make the illumination apparatus small while setting the illumination area and the illumination position or the illumination time freely similarly as conventionally, and it is possible to realize an illumination apparatus, in which, the adjustment of the optical system is easy. Furthermore, the spatial modulation element 3 being of reflecting type, it is possible to realize an illumination apparatus having a high efficiency of light.

Moreover, in the illumination apparatus for microscope of the present embodiment, it is preferable that a quarter wavelength plate is disposed between the spatial modulation element and the polarizing beam splitter.

By using the quarter wavelength plate, it is possible to make a polarization state of light incident on the polarizing beam plate from the spatial modulation element to be a more linear state (linearly polarized light). As a result, the loss of quantity of light when the light is transmitted through the polarizing beam splitter is suppressed. Accordingly, it is possible to realize an illumination apparatus having higher efficiency of light. Moreover, since it is possible to have bright illumination, it is possible to improve the contrast of the observation image.

Moreover, in the illumination apparatus for microscope of the embodiment, it is preferable that the second illumination optical system has a variable aperture, and the variable aperture is disposed at a position which is conjugate with a pupil position of a microscope objective lens.

By making such arrangement, it is possible to adjust a quantity of the illumination light.

Moreover, a microscope of the present embodiment is a microscope which includes an illumination apparatus, a main-body section, an observation unit, and a control unit, and the abovementioned illumination apparatus for microscope is to be used as the illumination apparatus.

Figure 4:
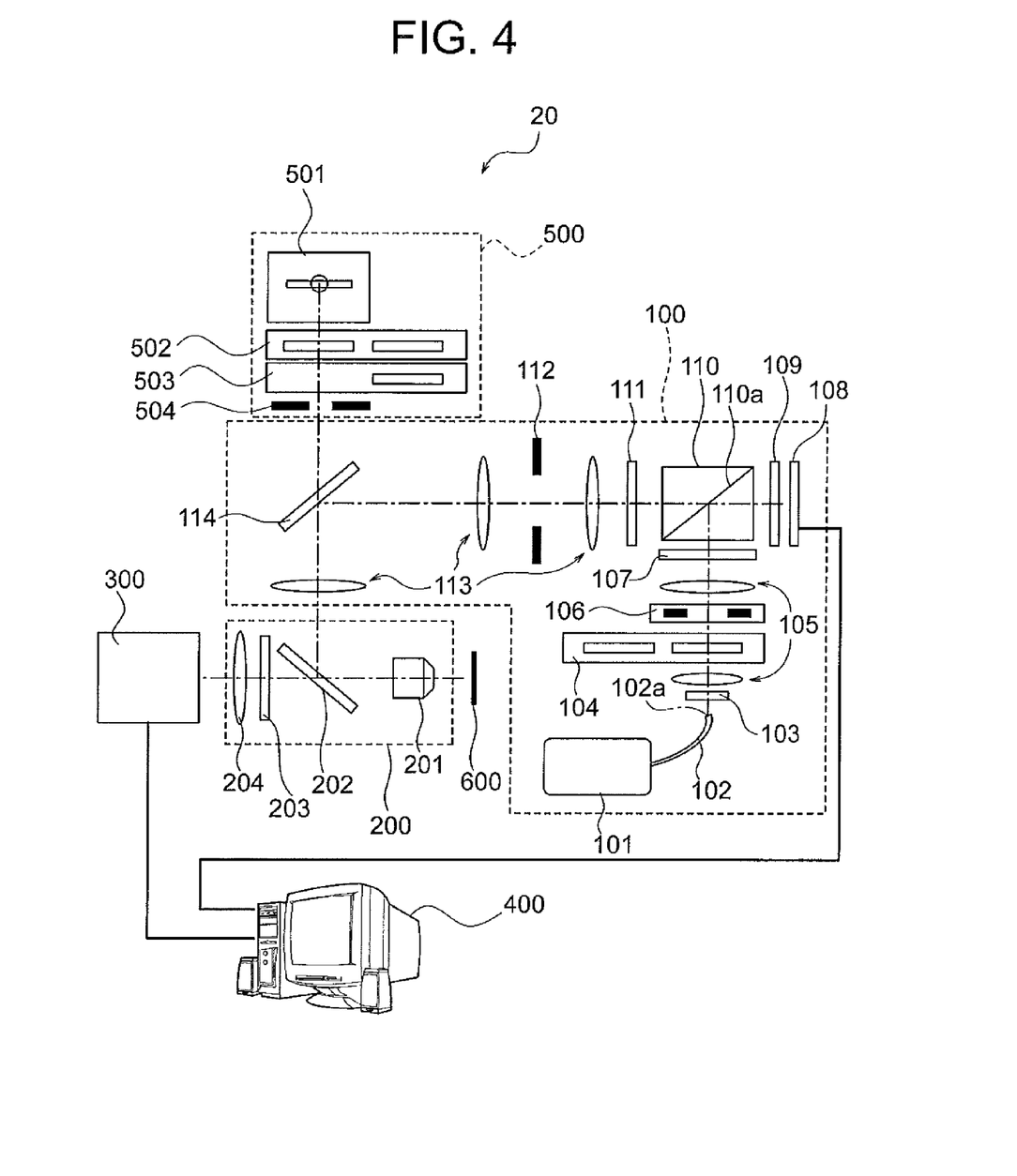
FIG. 4 is a diagram showing an arrangement of a microscope according to the embodiment of the present invention.

FIG. 4 is a diagram showing an arrangement of the microscope according to the present embodiment. A microscope 20 includes an illumination apparatus 100, a main-body section 200, an observation unit 300, and a control unit 400. The illumination apparatus 100 and the observation unit 300 are connected to the main-body unit 200. Furthermore, an illumination apparatus 500 is connected to the illumination apparatus 100. Moreover, the abovementioned illumination apparatus for microscope is used as the illumination apparatus 100.

The illumination apparatus 100 includes a light source 101, a spatial modulation element 108, a first illumination optical system 105, and a second illumination optical system 113. Moreover, the illumination apparatus 100 has two optical paths.

The light source 101, an optical fiber 102, a UV (an ultra violet) cut filter 103, a wavelength selection filter 104, the first illumination optical system 105, a shutter 106, a polarizing plate (polarizer) 107, the spatial modulation element 108, a quarter wavelength plate 109, and a polarizing beam splitter 110 are disposed in one of the optical paths of the illumination apparatus 100. In such manner, the first illumination optical system 105 is disposed in the optical path from the light source 101 up to the spatial modulation element 108.

The spatial modulation element 108, the quarter wavelength plate 109, the polarizing beam splitter 110, a polarizing plate (analyzer) 111, an aperture stop 112, and the second illumination optical system 113 are disposed in the other optical path of the illumination apparatus 100. In such manner, the second illumination optical system 113 is disposed in the optical path from the spatial modulation element 108 up to a position of a specimen 600.

The light source 101 is a mercury lamp for example. The optical fiber 102 is disposed between the light source 101 and the first illumination optical system 105. Light emerged from the light source 101 passes through the optical fiber 102, and is transmitted to the first illumination optical system 105. Therefore, an emerging-side end surface 102a of the optical fiber 102 is a practical light emitting portion.

The emerging-side end surface 102a is positioned on an optical axis of the first illumination optical system 105. Moreover, the UV cut filter 103 is disposed between the emerging-side end surface 102a and the first illumination optical system 105. However, the UV cut filter 103 is not indispensable.

The first illumination optical system 105 includes two lenses. Moreover, the wavelength selection filter 104 and the shutter 106 are disposed on the optical axis of the first illumination optical system 105. In FIG. 4, the wavelength selection filter 104 and the shutter 106 are disposed between the two lenses. A lens arrangement of the first illumination optical system 105 and installation locations of the wavelength selection filter 104 and the shutter 106 are not restricted to an arrangement and installation locations shown in FIG. 4.

The polarizing beam splitter 110 is disposed at a position facing the emerging-side end surface 102a, sandwiching the first illumination optical system 105. An installation position of the polarizing beam splitter 110 is a position at which, the optical axis of the first illumination optical system and an optical axis of the second illumination optical system 113 (an axis orthogonal to the optical axis of the first illumination optical system 105) intersect. In such manner, the first illumination optical system 105 and the second illumination optical system 113 are disposed such that the optical axes (optical paths) thereof intersect, and the polarizing beam splitter 110 is disposed at a position of intersection.

Moreover, the polarizing plate 107 is disposed between the first illumination optical system 105 and the polarizing beam splitter 110. However, the polarizing plate 107 is not indispensable.

The quarter wavelength plate 109 and the spatial modulation element 108 are disposed on the optical axis of the second illumination optical system 113. In such manner, the spatial modulation element 108 is disposed in a direction in which, light from the first illumination optical system 105 is reflected at the polarizing beam splitter 110. However, the quarter wavelength plate 109 is not indispensable.

In the illumination apparatus 100 with the arrangement as described above, light emerged from the light source 101 passes through the optical fiber 102 and emerges from the emerging-side end surface 102a. Light emerged from the emerging-side end surface 102a passes through the UV cut filter 103 and the first illumination optical system 105, and is incident on the wavelength selection filter 104.

Light of a plurality of wavelengths is generated simultaneously from the light source 101. Here, with stimulus due to light or a fluorescent observation, light of a specific wavelength is irradiated to the specimen 600. Therefore, in a case of imparting stimulus by light or the fluorescent observation, the wavelength selection filter 104 is to be inserted in the optical path. Accordingly, it is possible to extract light of a desired wavelength, or in other words, excitation light from the light of the plurality of wavelengths. A plurality of wavelength selection filters 104 may be disposed in order to be able to extract excitation light of various wavelengths.

In a bright-field observation, white light is irradiated to the specimen 600. Therefore, in a case of carrying out the bright-field observation, the wavelength selection filter 104 is to be moved outside of the optical path. In such manner, in an observation of a microscope, according to an observation method, the excitation light or the white light is to be irradiated to the specimen 600, and a case of carrying out the fluorescent observation will be described below.

The excitation light emerged from the wavelength selection filter 104 passes through the shutter 106. When the excitation light is not to be irradiated to the specimen 600, the excitation light is to be shielded by the shutter 106.

The excitation light that has passed through the shutter 106, by being passed through the polarizing plate 107 becomes linearly polarized light (such as S-polarized light).

The excitation light passed through the polarizing plate 107 is incident on the polarizing beam splitter 110, and reaches a surface 110a of the polarizing beam splitter 110.

An optical film is provided to the surface 110a. The optical film has a characteristic of reflecting the S-polarized light, and allowing transmitting P-polarized light. The excitation light that has reached the surface 110a being the S-polarized light, the excitation light is reflected at the surface 110a. The excitation light reflected at the surface 110a is incident on the quarter wavelength plate 109.

Here, the excitation light passes through the polarizing plate 107, and is reflected at the polarizing beam splitter 110. Consequently, polarized state of the excitation light emerged from the polarizing beam splitter 110 is a linear state (linearly polarized light).

The excitation light emerged from the quarter wavelength plate 109 is incident on the spatial modulation element 108.

Moreover, in a case in which, the light source 101 is a laser, the light emerged from the laser becomes parallel light. In a case in which, the optical fiber 102 is not to be used, parallel light is emerged from a position of the light emitting portion 102a. In this case, it is preferable to make the first illumination optical system 105 an afocal optical system. By making the first illumination optical system 105 an afocal optical system, light incident on the spatial modulation element 108 becomes parallel light. As a result, it is possible to make the spatial modulation element 108 a practical light emitting portion.

The optical fiber 102 may be used. In a case in which, a diameter of the optical fiber 102 is large (in a case of a multimode fiber and a bundle fiber), since an emerging end surface becomes a planar light source, the arrangement in FIG. 4 can be used. In a case in which, the diameter of the optical fiber 102 is small (in a case of a single-mode fiber), since the emerging end surface becomes a point light source, in this case, after being converted to the parallel light, the afocal optical system is to be used.

In the spatial modulation element 108, it is possible to change polarization of light in each micro area. Therefore, by combining with a polarizing element, such as by changing the area of micro areas at which the reflection occurs and the area of micro areas at which the reflection does not occur, it is possible to generate light emitting portions of various shapes in the spatial modulation element 3. Moreover, by changing the time of maintaining the state of the liquid crystal, the illumination time can also be changed.

Polarized state of the excitation light reflected at the spatial modulation element 108 becomes a linear state (linearly polarized light). However, the direction of polarization is orthogonal to the direction of polarization when the excitation light was incident. In other words, the excitation light reflected at the spatial modulation element 108 becomes P-polarized light.

The polarized state of the excitation light reflected at the spatial modulation element 108 becomes slightly elliptical state sometimes (elliptically polarized light). Therefore, by making the excitation light incident on the quarter wavelength plate 109, it is possible to make the elliptically polarized light to be linearly polarized light.

The excitation light that has passed through the quarter wavelength plate 109 being P-polarized light, is transmitted through the surface 110a, and emerges from the polarizing beam splitter 110. The polarizing plate (analyzer) 111, the aperture stop 112, and the second illumination optical system 113 are disposed in a direction of emergence. In such manner, the second illumination optical system 113 is disposed at a position facing the spatial modulation element 108, sandwiching the polarizing beam splitter 110. The polarizing plate 111 is not indispensable.

The second illumination optical system 113 includes three lenses. Moreover, the aperture stop 112 is disposed on the optical axis of the second illumination optical system 113. In FIG. 4, the aperture stop 112 is disposed between the lenses. The aperture stop 112 is disposed at a position conjugate with a pupil position of a microscope objective lens 201. Moreover, a size of an aperture is variable in the aperture stop 112. A lens arrangement of the second illumination optical system 113 and an installation location of the aperture stop 112 are not restricted to the arrangement and the installation location shown in FIG. 4.

The excitation light emerged from the polarizing beam splitter 110 passes through the polarizing plate (analyzer) 111. From the polarizing plate 111, only linearly polarized light (S-polarized light) is emerged. The excitation light emerged from the polarizing plate 111 passes through the aperture stop 112 and the second illumination optical system 113, and is incident on a dichroic mirror 114.

The dichroic mirror 114 is disposed for allowing transmitting illuminating light from another illumination apparatus 500. Here, instead of the dichroic mirror 114, a half mirror may be used. Moreover, in a case in which, the illumination apparatus 500 is not installed, instead of the dichroic mirror 114, a mirror may be used.

Another illumination apparatus 500 includes a light source 501, a wavelength selection filter 502, a shutter 503, and a field stop 504. A mercury lamp is available as the light source 501. Light of a plurality of wavelengths is generated simultaneously from the mercury lamp. Therefore, in a case of carrying out fluorescent observation, by inserting the wavelength selection filter 502 in an optical path, only the excitation light is extracted from the light of plurality of wavelengths. In a case in which, illuminating by the light source 501 is not carried out; the excitation light is to be shielded with the shutter 503.

The excitation light emerged from the wavelength selection filter 502 passes through the field stop 504, and is incident on the dichroic mirror 114. Out of the excitation light incident on the dichroic mirror 114, the excitation light emerged from the illumination apparatus 100 is reflected at the dichroic mirror 114, and the excitation light emerged from the illumination apparatus 500 is transmitted through the dichroic mirror 114. The excitation light emerged from the dichroic mirror 114 is incident on the main-body portion 200 of the microscope 20.

The main-body section 200 includes the microscope objective lens 201, a dichroic lens 202, a barrier filter (excitation-light cut filter) 203, and a tube lens 204. The dichroic mirror 202, the barrier filter 203, and the tube lens 204 are disposed on an optical axis of the microscope objective lens 201, in order from the specimen 600 side.

The excitation light incident on the main-body section 200 is reflected at the dichroic mirror 202, and then passes through the microscope objective lens 201, and is irradiated to the specimen 600. Here, the position of the spatial modulation element 108 is conjugate with a position of the specimen 600. Therefore, a shape of a light emitting portion generated in the spatial modulation element 108 is projected on the specimen 600. Accordingly, it is possible to illuminate a desired area and a desired position on the specimen 600.

Fluorescent light emerged from the specimen 600 passes through the microscope objective lens 201, the dichroic mirror 202, the barrier filter 203, and the tube lens 204. Here, as the dichroic mirror 202 and the barrier filter 203, components having a characteristic of allowing a wavelength of fluorescent light to be transmitted through are to be used. Accordingly, light other than the fluorescent light is shielded at the dichroic mirror 202 and the barrier filter 203.

The fluorescent light passed through the tube lens 204 is converged at a predetermined position. An image of the specimen 600 is formed at this predetermined position. Moreover, the observation unit 300 is disposed at this predetermined position. In a case in which, the observation unit 300 includes an image pickup element (such as a CCD (charge coupled device) and a CMOS (complementary metal-oxide semiconductor), the observation unit 300 is to be disposed such that a position of an image pickup surface of the image pickup element coincides with the predetermined position. The observation unit 300 may be a binocular tube. When the binocular tube is used, it is possible to observe the image of the specimen 600 with a naked eye via an eyepiece.

In the observation unit 300, the image of the specimen 600 and an appearance of illumination (illumination area and illumination position) are acquired. Therefore, the observation unit 300 and the control unit 400 are to be connected electrically. Accordingly, it is possible to check the image of the specimen 600 and the appearance of illumination by the control unit 400. Furthermore, the illumination apparatus 100 and the control unit 400 are to be connected electrically. Accordingly, since it is possible to control the spatial modulation element 108 by the control unit 400, it is possible to set the illumination area, and the illumination position or the illumination time freely.

In FIG. 4, the control unit 400 is a personal computer. However, the control unit 400 is not restricted to the personal computer. A terminal of a portable type or a tablet type may be used as the control unit 400. Moreover, transceiving of information between the observation unit 300 and the illumination apparatus 100 may be carried out by wireless communication.

The present invention can have various modified embodiments without departing from the scope of the invention. For instance, an arrangement may be made such that a lens is moved or is inserted in and removed from the first illumination optical system 105 and the second illumination optical system 113. When such arrangement is made, it is possible to let the position of the spatial modulation element 108 to be conjugate with the pupil position of the microscope objective lens 201. As a result, it is possible to carry out Koehler illumination.

Moreover, a plurality of illumination apparatuses 100 may be disposed. For example, in FIG. 4, the illumination apparatus 100 may be disposed instead of the illumination apparatus 500. When such arrangement is made, it is possible to irradiate the excitation light of different wavelengths to the specimen 600 simultaneously.

According to the present invention, it is possible to provide an illumination apparatus for microscope having a high efficiency of light, and a microscope using the same. Moreover, it is possible to provide an illumination apparatus for microscope in which, an adjustment of the optical system is easy, and a microscope using the same.

As it has been described above, the present invention is suitable for an illumination apparatus for microscope with a high efficiency of light, a small size, and in which, an adjustment of the optical system is easy, and a microscope using the same.

What is claimed is:

1. An illumination apparatus for a microscope, the illumination apparatus comprising:
    a light source;
    a spatial modulation section;
    a first illumination optical system; and
    a second illumination optical system,
    wherein:
        the spatial modulation section includes a spatial modulation element which is of reflecting type, and a polarizing element,
        the first illumination optical system is disposed in an optical path from the light source up to the spatial modulation element,
        the second illumination optical system is disposed in an optical path from the spatial modulation element up to a specimen position, and
        a position of the spatial modulation element is optically conjugate with the specimen position.

2. The illumination apparatus according to claim 1, wherein:
    the first illumination optical system and the second illumination optical system are disposed such that an optical path of the first illumination optical system and an optical path of the second illumination optical system intersect,
    a beam splitter is disposed at a position where the optical path of the first illumination optical system and the optical path of the second illumination optical system intersect,
    the spatial modulation element is disposed in a direction in which light from the first illumination optical system is reflected by the beam splitter, and
    the second illumination optical system is disposed at a position facing the spatial modulation element, sandwiching the beam splitter.

3. The illumination apparatus according to claim 2, wherein the beam splitter is a polarizing beam splitter which also serves as the polarizing element.

4. The illumination apparatus according to claim 2, wherein a first polarizing plate through which only linearly polarized light is transmitted is disposed between the light source and the beam splitter.

5. The illumination apparatus according to claim 4, wherein a second polarizing plate through which only linearly polarized light is transmitted is disposed between the beam splitter and the second illumination optical system.

6. The illumination apparatus according to claim 5, wherein a quarter wavelength plate is disposed between the spatial modulation element and the polarizing beam splitter.

7. The illumination apparatus according to claim 1, wherein:
    the second illumination optical system includes a variable aperture, and
    the variable aperture is disposed at a position which is optically conjugate with pupil position of a microscope objective lens.

8. The illumination apparatus according to claim 1, wherein the illumination apparatus is included in the microscope, and the microscope further comprises:
    a main-body section;
    an observation unit; and
    a control unit.

\* \* \* \* \*